United States Patent [19]

Russell

[11] 4,035,223

[45] July 12, 1977

[54] LAMINATING TRAVELING PRESS AND METHOD

[76] Inventor: George F. Russell, 8513 - 42nd W., Tacoma, Wash. 98466

[21] Appl. No.: 528,217

[22] Filed: Nov. 29, 1974

Related U.S. Application Data

[63] Continuation-in-part of Ser. No. 357,960, May 7, 1973, Pat. No. 3,943,025.

[51] Int. Cl.² .......................................... B23K 27/00

[52] U.S. Cl. ................................ 156/443; 144/256; 144/281 C; 156/196; 156/380; 156/580

[58] Field of Search .......... 156/443, 580, 582, 583, 156/555, 563, 196, 274, 380; 100/154, 273; 144/256, 254, 257, 281 B, 281 C, 309 B, 309 P, 309 O

[56] References Cited

U.S. PATENT DOCUMENTS

| | | | |
|---|---|---|---|
| 2,071,999 | 2/1937 | Dike | 144/281 B |
| 2,135,763 | 11/1938 | Nicholson | 144/281 B |
| 2,662,564 | 12/1953 | Payzant | 144/281 B X |

FOREIGN PATENT DOCUMENTS

| | | | |
|---|---|---|---|
| 563,097 | 7/1944 | United Kingdom | 144/281 C |

*Primary Examiner*—David A. Simmons
*Attorney, Agent, or Firm*—Robert W. Beach

[57] ABSTRACT

Tread plates on mutually opposed endless belts clamp and move a pack of boards horizontally lengthwise between electrodes for setting adhesive between the boards by dielectric heating. The tread plates are engaged by backing members spaced transversely of the length of the belt, and the tread plates are connected by a chain located between the backing members. The portions of the tread plates engageable with a surface of the board pack are of a suitable plastic to deter passage of radio-frequency energy from an electrode to an electrically grounded portion of a tread plate or to the chain. Air bags are inflatable to press at least one endless belt against the board pack or to move such belt relative to supporting means away from the board pack. Adjusting means for prepressing rollers ahead of the endless tread belts on one side of the board pack and adjusting means for the endless tread belt on the same side of the board pack are interconnected for synchronized adjustment. A plurality of pivoted pressure rollers spaced lengthwise of the path of movement of the board pack ahead of the endless belts for engaging the board edges are connected by chains to synchronize them for conjoint movement toward and away from the sides of the board pack. Also, the endless belts can be curved to bend the pack of boards lengthwise. The curvature of the belts can be adjusted by mounting belt-supporting means on a plurality of jacks spaced lengthwise of the belts and connected by chain-and-sprocket speed reducer means for simultaneously adjusting the effective lengths of the various jacks in different related degrees.

5 Claims, 16 Drawing Figures

Fig. 7
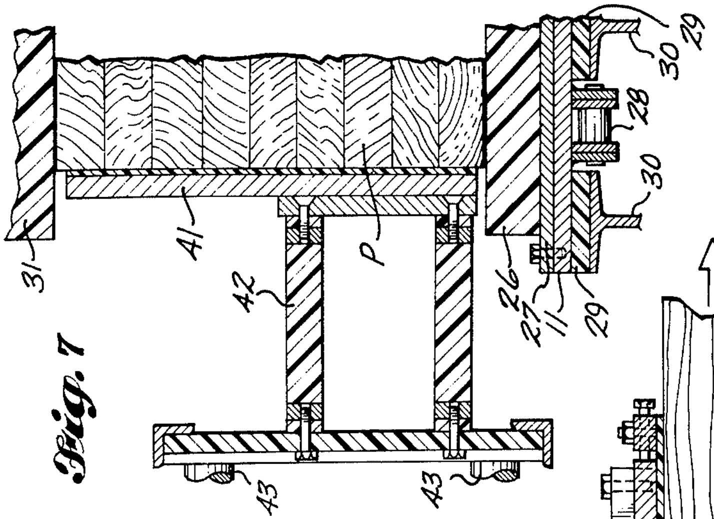
Fig. 5
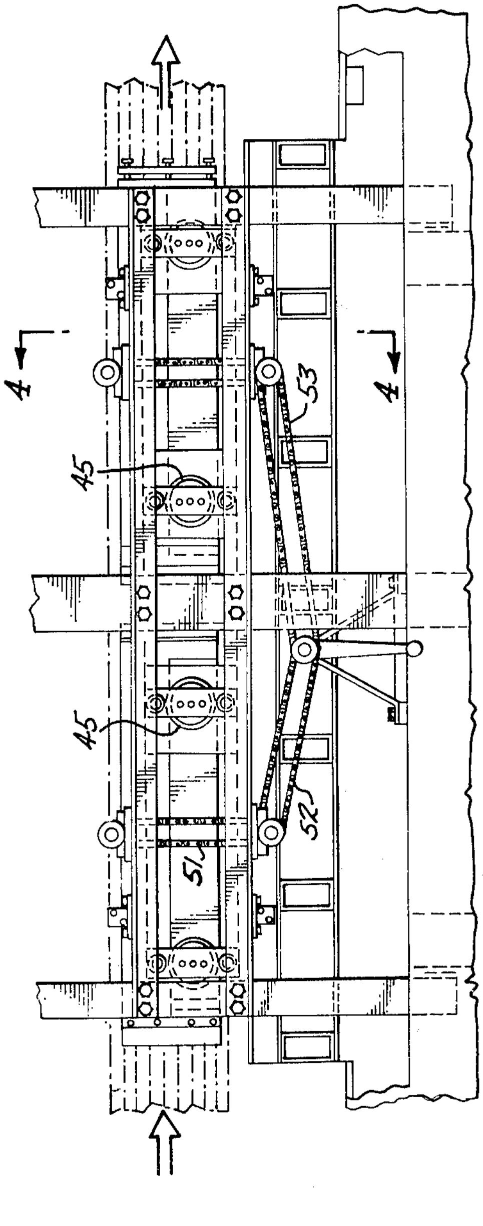
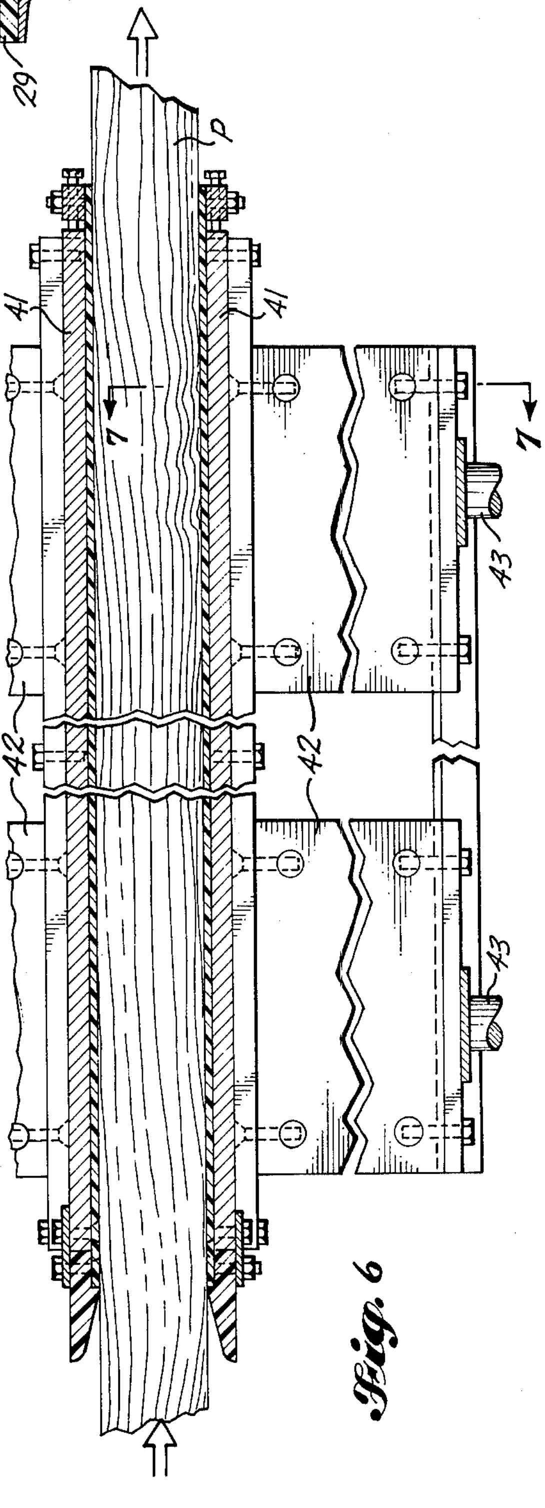
Fig. 6

LAMINATING TRAVELING PRESS AND METHOD

This application is a continuation-in-part of application Ser. No. 357,960, filed May 7, 1973, now U.S. Pat. No. 3,943,025, and entitled Laminating Travelling Press and Method.

The present invention relates to laminating traveling presses of the endless tread type which are particularly useful for laminating packs of boards in the manufacture of laminated beams which are curved lengthwise.

A principal object of the invention is to provide a laminating traveling press for setting adhesive by dielectric heating utilizing endless tread belts constructed to grip securely a pack of boards to be laminated in lengthwise curved configuration.

Another object is to provide mechanism for synchronizing adjustment of the press supportng mechanism so that laminated beams of different curvature can be produced.

FIG. 5 is a side elevation of a portion of the press showing portions of the press mechanism different from those shown in FIG. 3.

FIG. 6 is a horizontal plan through a portion of the press on an enlarged scale, parts being broken away, and FIG. 7 is a detail vertical section through a portion of the press taken on line 7—7 of FIG. 6.

Figure 1:
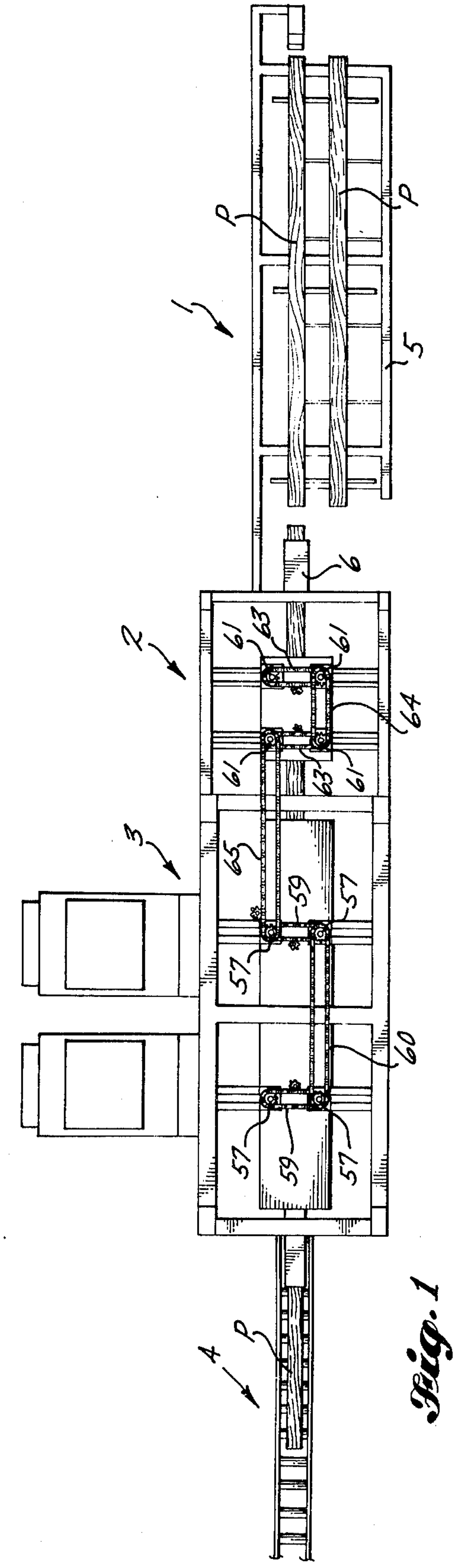
FIG. 1 is a plan of a laminating traveling press according to the present invention.
Figure 2:
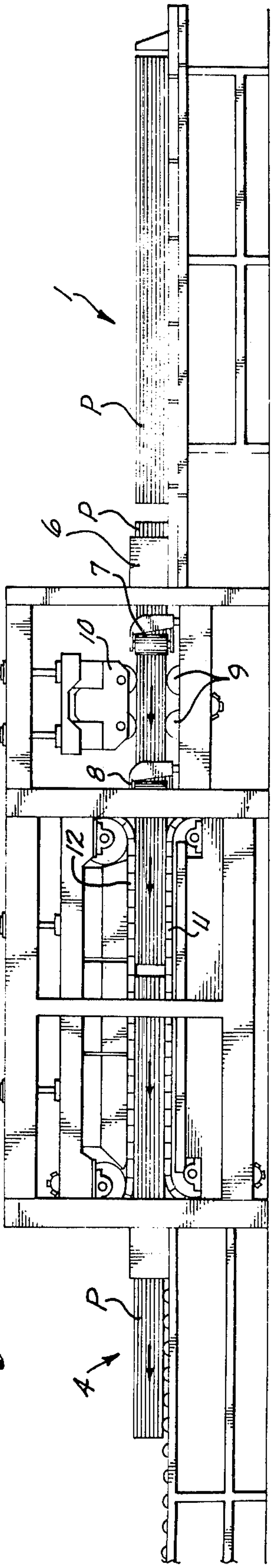
FIG. 2 is a side elevation of such press.

The laminating traveling press shown generally in FIGS. 1 and 2 includes in sequence an infeed section 1, a prepress section 2, a main press section 3 and an outfeed section 4. Packs P of boards to be laminated are supplied in stacked condition with adhesive between them to the table 5 of the infeed section. Such adhesive is preferably a thermosetting resin which can be set by dielectric heating or chemical action. The table 5 may accommodate several packs in side-by-side relationship, which can be moved transversely of their lengths successively into alignment with the other sections of the press.

From the infeed section 1, the packs P are fed lengthwise through the tunnel 6 into the prepress section 2. Each such pack is fed between at least two sets of upright side evening rollers 7 and 8 spaced lengthwise of the path of movement of the pack of boards through the press. The evening rollers of each pair are pressed toward each other so as to move the boards of each pack relatively edgewise into precise registration before the adhesive between adjacent boards is set.

In the prepress section 2, the pack of boards is supported by a plurality of live rollers 9 and is compacted by hold-down mechanism 10. With the boards in the pack evened edgewise and with the pack of boards thus preliminarily compacted, the pack is fed by the prepress section into the press section 3 between a lower endless tread belt 11 and an upper endless tread belt 12. These belts move the pack through the main press section where the adhesive is set, after which the endless tread belts discharge the pack to the outfeed section 4.

Figure 3:
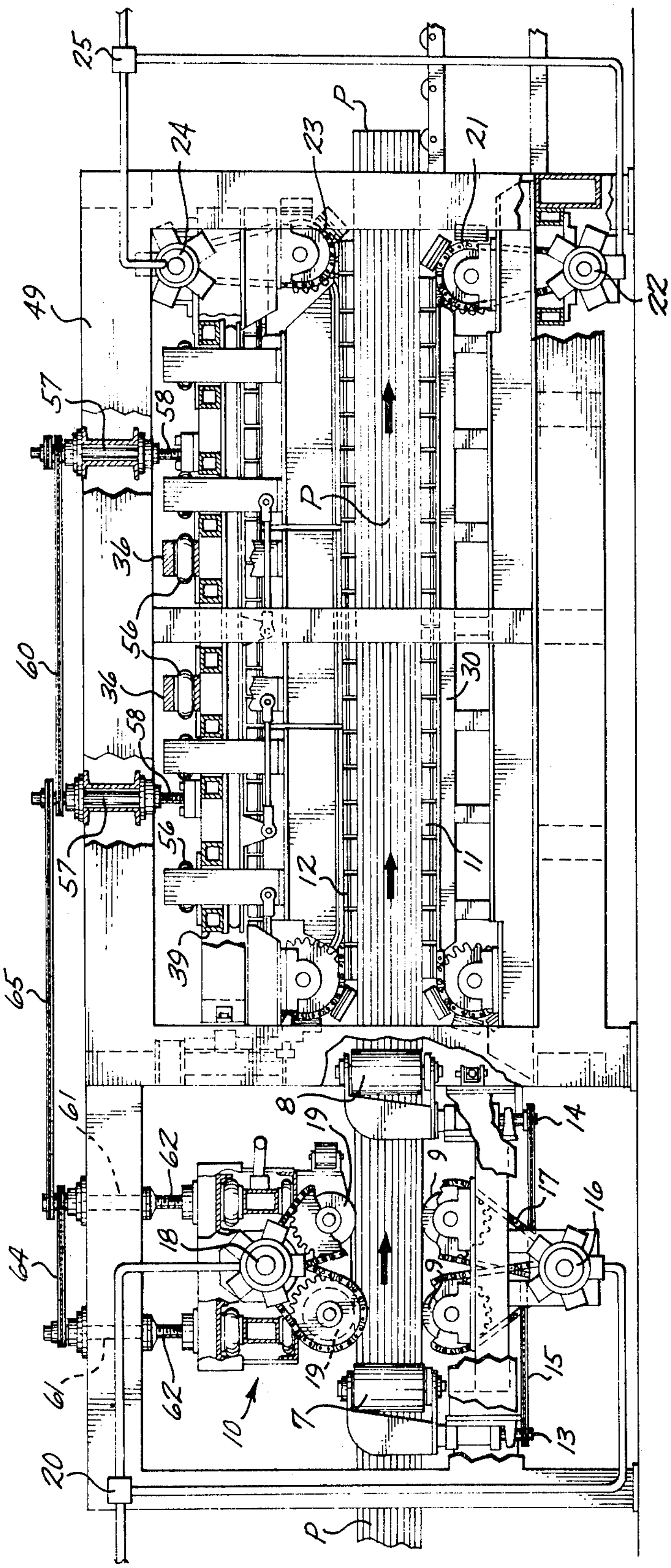
FIG. 3 is an enlarged side elevation of the press side opposite the side shown in FIG. 2, parts being broken away.

As shown in FIG. 3, each infeed side evening roller 7 is mounted eccentrically on a swivel shaft 13, and each outfeed side evening roller 8 is mounted eccentrically on a swivel shaft 14. Sprockets on the two swivel shafts 13 and 14 on the same side of a board pack are connected by a chain 15, so as to synchronize swivelling of the rollers 7 and 8. As a pack of boards enters between the infeed evening rollers 7, therefore, and they are spread to receive such pack, the outfeed rollers 8 will be spread correspondingly by the chain 15 turning shaft 14 to the same degree that shaft 13 is turned by swivelling of rollers 7. Consequently, rollers 8 will be spread to the same extent as rollers 7.

The side evening rollers 7 and 8 may be idler rollers or may be live rollers. The rollers 9 supporting the pack of boards in the feed press section are live rollers, preferably being driven by a hydraulic motor 16 connected by chain and sprocket drives 17 to the live rollers 9. Correspondingly, a hydraulic motor 18 drives live rollers 19 of the hold-down 10, which bear on the upper side of the board pack in the prepress section. In order to obtain the most effective driving action of the lower rollers 9 and the upper rollers 19, it is preferred that each upper roller 19 be disposed substantially directly above a lower roller 9, as shown in FIG. 3.

In moving the packs of boards P through the prepress section 2, it is important that the same tractive effort be applied to the top and bottom of the pack so as to avoid any tendency of boards in the pack to be slipped lengthwise relative to each other. Consequently, the lower live rollers 9 and the upper live rollers 19 are driven at precisely the same speed by effecting rotation of the hydraulic motors 16 and 18 driving the lower and upper live rollers, respectively, in exact synchronism. Synchronization of these motors is effected by supplying liquid under pressure to them by the flow-divider 20 which regulates the flow of driving liquid to the two motors equally.

As the packs P of boards are fed by the prepress section 2 into the main press section 3, the board packs are conveyed by cooperation of the lower and upper endless tread belts 11 and 12. The lower belt 11 is moved by chain 21 driven by a hydraulic motor 22. The upper endless tread belt 12 is moved by a chain 23 driven by a hydraulic motor 24. Again, it is important for the lower endless tread belt and the upper endless tread belt to be driven in precise synchronism. Consequently, liquid is supplied both to the lower motor 22 and to the upper motor 24 through a flow-divider 25 which proportions the flow of liquid to the two motors exactly equally.

Figure 4:
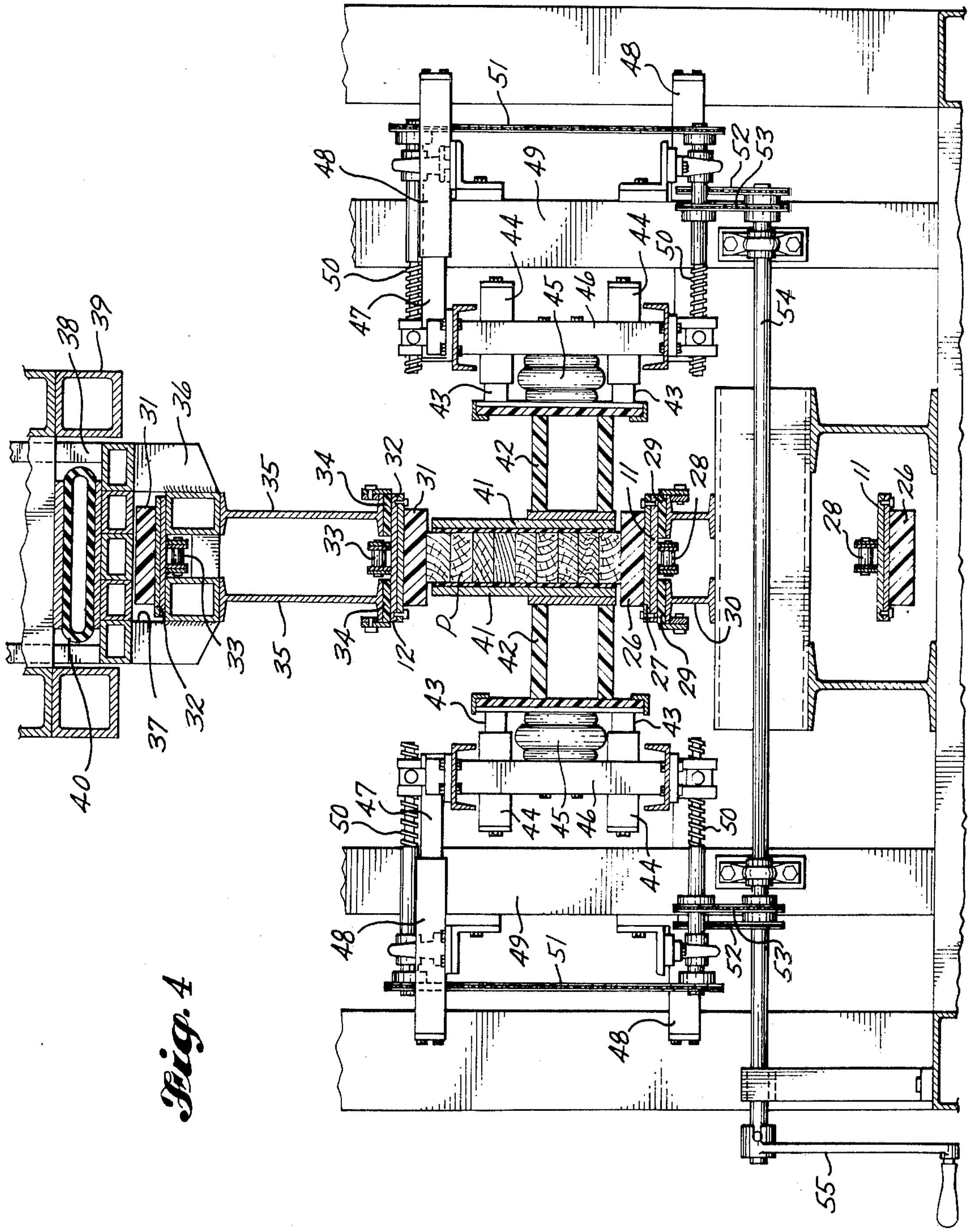
FIG. 4 is a transverse section through the press on a further enlarged scale taken on line 4—4 of FIG. 5.

The constructions of the lower endless tread belt 11 and of the upper endless tread belt 12 are substantially the same, as indicated in FIG. 4 and provide substantially continuous planar parallel opposing press faces. The tread plates 26 of the lower belt 11 are made of quite hard dielectric material, such as polyurethane having a durometer value of 90. Such plastic tread components are bonded to mounting plates 27 that are secured by bolts to the plate elements 11 secured to the endless chain 28 driven by the drive chain 21. The tread components are mounted in closely spaced relationship as shown in FIG. 3 to provide the substantially continuous pressure face engageable with the board pack.

The endless chain 28 does not carry any weight of the tread plates 26, 27 or of the pack P of boards supported by such tread plates. Instead, opposite edge portions of the plates 11 attached to the chain 28 bear directly on backing strips 29 of hard, low-loss, nonpolar, low-friction, dielectric material, such as polyethylene plastic, bonded to the upper flanges of supporting I-beams constituting the press bed 30. Such hard polyethylene plastic material is high density polyethylene, or even ultrahigh molecular weight polyethylene. The I beam flanges and strips 29 supporting opposite sides of plates 11 are spaced apart sufficiently to receive the chain 28 between them.

The upper endless tread belt 12 includes tread plate portions 31 made of quite hard dielectric material, such as polyurethane, like the tread portions 26 of the lower endless tread belt. Each of these tread plate portions is bonded to a metal plate 32 that is secured by bolts to a tread plate 12 secured to the endless chain 33. Such chain is received in the slot between backing strips 34 bonded to the lower flanges of I beams 35. Such backing strips, like the strips 29, are made of hard low-friction dielectric material, such a polyethylene plastic. The chain 33 is driven by the driven chain 23.

The entire upper endless tread belt mechanism is supported by superstructure including the parallel I-beams 35 that are carried by, and project downward from, a frame 36. Such frame has a passage 37 in it, through which the upper return stretch of the endless tread belt 12 passes. This frame is guided for elevational movement by upright guide rods 38 reciprocable in an elevationally adjustable support 39.

With such support in any selected elevationally adjusted position corresponding to the depth of a pack P of boards, downward pressure can be exerted on the lower stretch of the upper endless tread belt for the purpose of compacting the boards in the pack P while the adhesive is being set. Downward force is created by supplying gas or liquid under pressure to an expandable chamber 40, such as an elongated flattened air bag. Such air bag is interposed between the support 39 and the frame 36. Force exerted by expansion of the air bag is transmitted through the I beams 35 and the backing strips 34 to the tread plates 31, 32.

While the boards of the pack P are thus held under pressure, the coordinated movement of the lower belt 11 and of the upper belt 12 moves the pack P longitudinally between dielectric heating electrodes 41 shown best in FIGS. 4 and 7 which are elongated lengthwise of the pack and, as shown in FIG. 5, extend over virtually the entire length of the endless tread belts. Such electrodes are carried by mounts 42 mounted on slides 43 reciprocable in guides 44. These electrodes may be pressed resiliently toward the opposite sides of the pack P, respectively, by inflatable bags 45 interposed between the mounts 42 and supports 46 which, in turn, are carried by slides 47 reciprocable in guides 48.

The guides 48 are mounted stationarily on posts 49 of the press frame. Also mounted on such posts are screws 50 engageable with the electrode supports 46 for effecting movement of such supports toward or away from a pack P of boards in the main press section 3 of the press. All of the screws 50 at one side of the endless tread belts are interconnected by chains 51, 52 and 53. Sprockets engaged by chains 52 and 53 at opposite sides of the press are secured to a cross shaft 54 on one end of which a crank 55 is mounted.

Because all of the screws 50 at each side of the press are connected by the chains 51, 52 and 53 and because such chains 52 and 53 at opposite sides of the press are interconnected by shaft 54, manual turning of the crank 55 will rotate all of the screws 50 at the same speed to move the electrode supports 46 at opposite sides of the press to the same extent toward or away from the pack P of boards. By such crank turning, therefore, the positions of the electrode mounts at opposite sides of the endless tread belts can be adjusted toward or away from each other quickly and easily for approximate location of the electrodes 41 corresponding to the width of the boards in a particular pack. When the positions of the electrode mounts have been thus set, the bags 45 can be inflated to press the electrodes resiliently against opposite sides of the pack.

It is desirable to deter leakage of radio-frequency energy from the electrodes 41 past the edges of the electrically insulating tread plates 26 to grounded metal electrically conducting portions 11 or 27 of the tread plates or the chain 28 as far as possible. Consequently, the insulating tread plate portion 26 should be sufficiently wide and thick so that the leakage path from the electrodes 41 at opposite sides of the pack P of boards to an electrically conducting portion of the endless tread belt is at least great enough to prevent appreciable leakage of radio-frequency energy from such electrodes. While it is preferred that both of the electrodes 41 be live, one of such electrodes could be live and the other grounded as in a single ender system.

If it should be desired to relieve the pack of boards P from pressure by the upper endless tread conveyor 12, the entire frame 36 and the conveyor driving mechanism can be raised relative to the support 39 by deflating the bag 40 and inflating bags 56, shown in FIG. 3. Such bags are engaged between upper cross pieces of the frame 36 and the upper portion of the support 39. Inflation of such bags moves the slides 38 upward to raise the endless tread conveyor 12 bodily through a short distance.

If it should be desired to retract the entire upper endless tread conveyor toward a substantial distance, such retraction can be effected by rotating simultaneously internally threaded sleeves 57 threadedly engaged with screws 58, the lower ends of which are connected to and carry the entire endless tread belt support 39. Preferably, at least four sets of internally threaded sleeves 57 and screws 58 carry the endless tread conveyor support 39. Such pairs of sleeves and screws are arranged in the rectangular relationship shown at the left of FIG. 1.

In order to insure simultaneous and equal elevational movement of all of the screws 58, the pairs of threaded sleeves 57 spaced transversely of the press are connected by chains 59. Also, two of the threaded sleeves spaced lengthwise of the press are connected by a chain 60. All of the threaded sleeves 57 are thus interconnected for conjoint rotation to raise and lower the upper endless tread belt evenly.

The entire hold-down 10 can also be raised and lowered, as may be desired, by simultaneous rotation of internally threaded sleeves 61 with which screws 62 are threadedly engaged. Such screws, preferably four in number, arranged in rectangular relationship, support the hold-down. The screws of each pair spaced transversely of the press are connected by transverse chain loops 63, and two of the threaded sleeves 61 spaced longitudinally of the press are connected by a chain loop 64, so that all of the threaded sleeves 61 are turned conjointly.

If either the hold-down 10 or the upper endless tread belt 12 is to be raised or lowered, it is desirable for the other to be raised or lowered simultaneously and to the same extent. Consequently, it is desirable to connect one of the hold-down threaded sleeves 61 with one of the upper endless tread belt threaded sleeves 57 by a chain loop 65, as shown in FIGS. 1 and 3, in particular, to coordinate rotation of all of the threaded sleeves 57 and all of the threaded sleeves 61. The chain and threaded sleeve system can be driven manually or by an electric or hydraulic motor, as may be desired.

In some instances, it may be desirable for laminated beams to be produced by the press of the present invention which are bent lengthwise. To produce such beams, the individual boards of the stack P'' are bent individually lengthwise and adhesive between such boards is set while they are held in such bent relationship. Such a bend will be on a very large radius, such as for the purpose of producing laminated beams with camber for arched roofs, for example. Press mechanism for producing such curved laminated packs of boards is shown n FIGS. 8 to 15.

In order to bond the boards of the pack P'' together so that the bonded structure which emerges from the press will be curved lengthwise, it is necessary for the endless tread belts 11 and 12 on opposite sides of the board pack to be curved complementally correspondingly. Thus, one of the endless tread belts, shown in FIG. 11 as the belt 11, will have a concave curvature toward the board pack, and the other endless tread belt 12 will have a complemental convex curvature toward the board pack.

Figure 8:
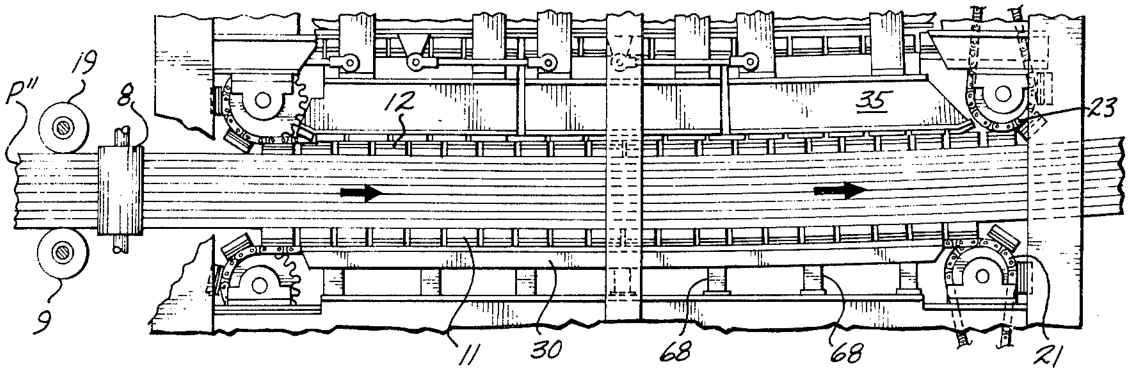
FIG. 8 is a fragmentary longitudinal section through press mechanism arranged to secure the boards of a pack together in longitudinally curved condition.
Figure 9:
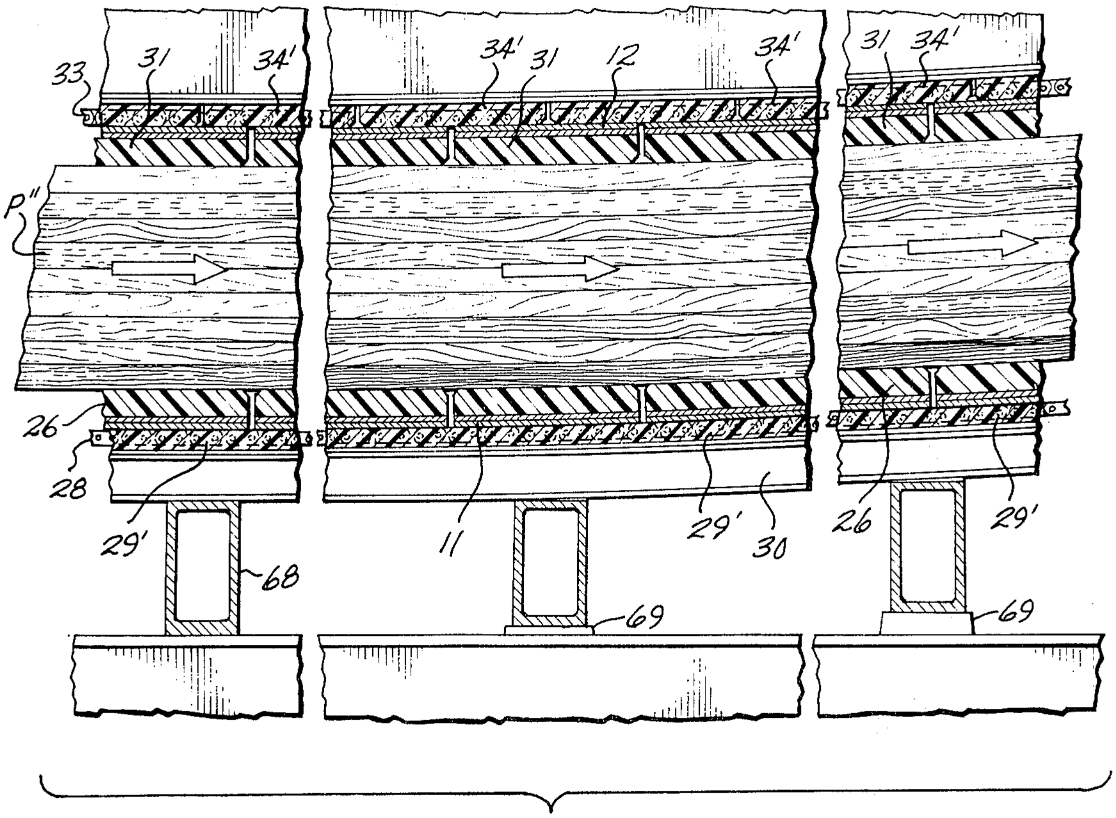
FIG. 9 is a fragmentary enlarged longitudinal section through such a press.

The endless tread belts may be shaped to the desired longitudinally curved contour by providing supporting members 29' for the belt 11 and forming the members of the press bed 30 increasing in elevation from left to right, as seen in FIGS. 8 and 9. Correspondingly, the backing members 34' for the opposite endless tread belt 12 will increase in elevation from left to right, as seen in FIGS. 8 and 9. Such increase in elevation of the backing members 29' for endless tread belt 11 of the backing members 34' for endless tread belt 12 is effected by deforming the frame of the press slightly by placing under supports 68 at the discharge end of the press shims 69 of different thicknesses or other elevating means. Each shim or elevating means farther from the discharge end of the press is thinner than the next shim or elevating means closer to the discharge end of the press.

Because of such variation in elevation of the backing members, the laminated member, P'', emerging from the press will curve upward, the individual laminations moving into the press being in horizontal planes. The curvature of the endless tread belt stretches engaging the opposite sides of the stack of boards will be very gradual. The difference in thickness of the adjacent shims or elevating means will determine the degree of curvature of the opposite stretches of the endless tread belts.

The prepress section of the press shown in FIGS. 8 and 9 is the same as the prepress section 2 shown in FIGS. 1 and 2. Consequently, the prepress compacting rollers 9 and 19 and the outfeed edge rollers 8 are shown rather diagrammatically. The pack of boards P can be fed into the prepress unit in the same manner as described with reference to the press of FIGS. 1, 2 and 3. In such case, each board will be in a horizontal plane.

FIGS. 10 to 16, inclusive, illustrate a type of press construction enabling the press bed to be curved to different contours for varying the lengthwise curvature of a laminated beam being constructed.

Figure 10:
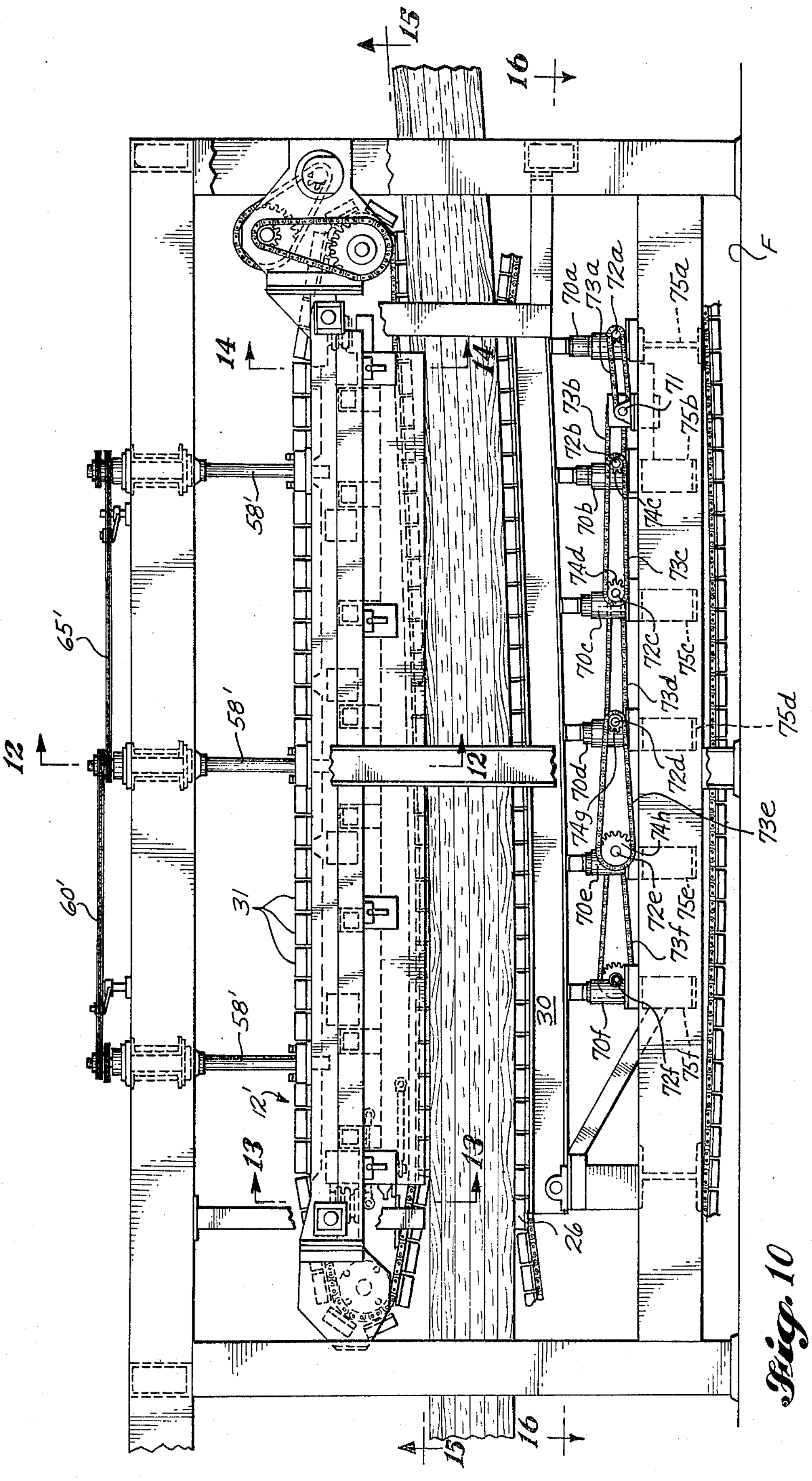
FIG. 10 is a side elevation of a press for producing longitudinally curved packs of boards including mechanism adjustable to vary the degree of curvature of the press and having parts broken away.

In general the construction of the press shown in FIGS. 10 to 16, inclusive, is similar to that described in connection with FIGS. 1 to 9, inclusive. A pack of boards P'' is moved lengthwise from left to right, as seen in FIG. 10, by upper and lower endless tread belts 12' and 11'. The lower belt 11' is carried by the bed 30 and includes tread plates 26 of hard polyurethane or other plastic material bonded to metal mounting plates 27' that are interconnected and moved by two endless chains 28' spaced apart transversely of their lengths. The upper endless tread belt 12' includes upper tread plates 31 made of hard polyurethane or other plastic material bonded to metal mounting plates 32' which are interconnected by two endless chain loops 33' spaced apart transversely of their lengths. While the widths of the boards in pack P'' are shown as being somewhat greater than the width of the tread plates 26 and 31, the tread plates may be wider than the boards of the pack, as shown in FIG. 4, depending upon the requirements for exerting pressure on the pack of boards to produce effective bonding.

Figure 11:
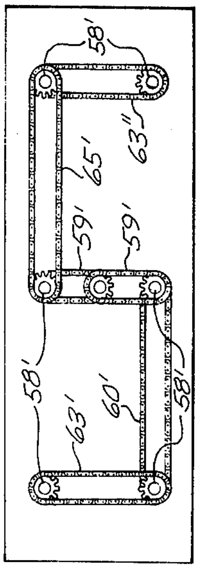
FIG. 11 is a plan of such press.
Figure 12:
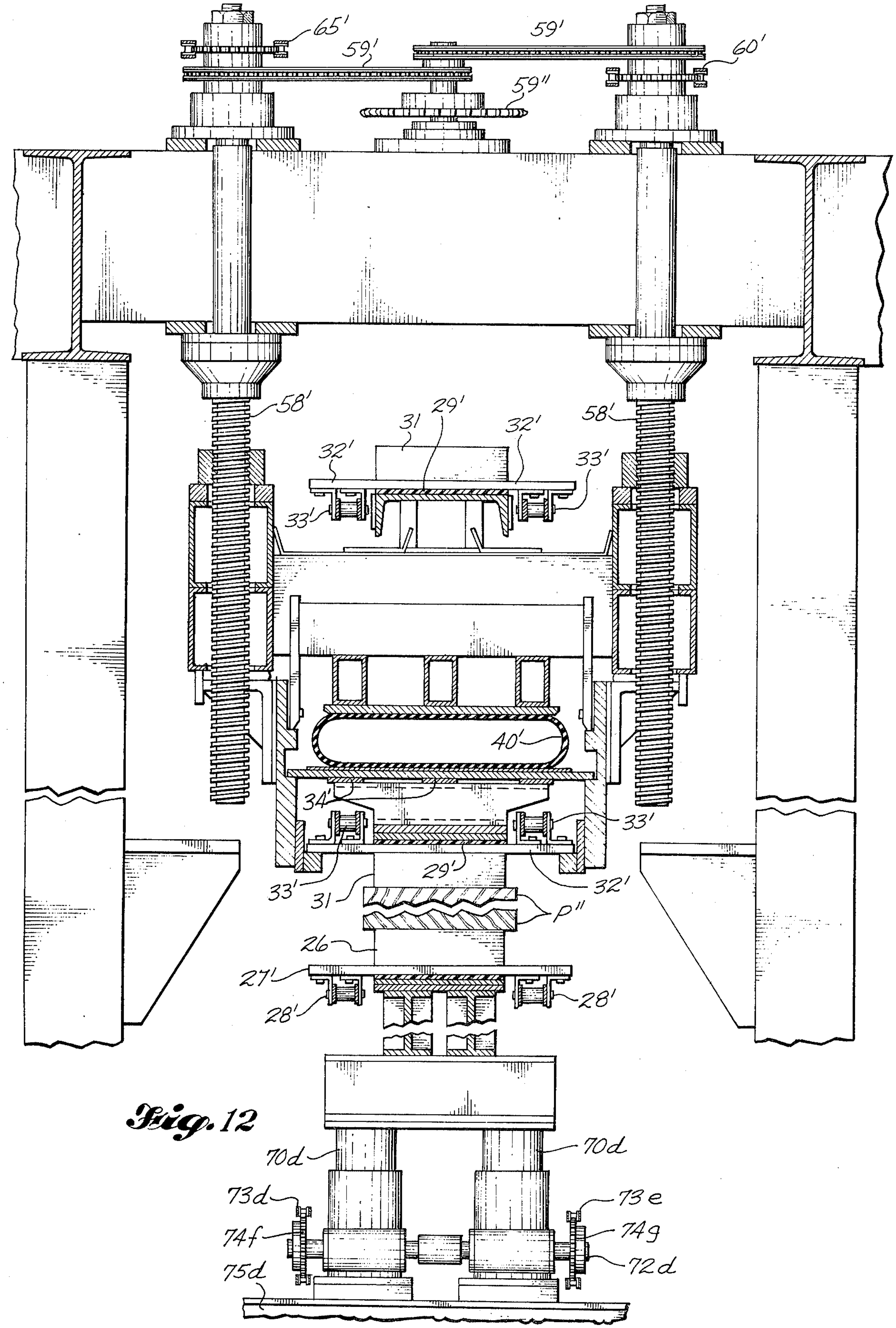
FIG. 12 is a central vertical transverse section through the press taken on line 12—12 of FIG. 10.
Figure 13:
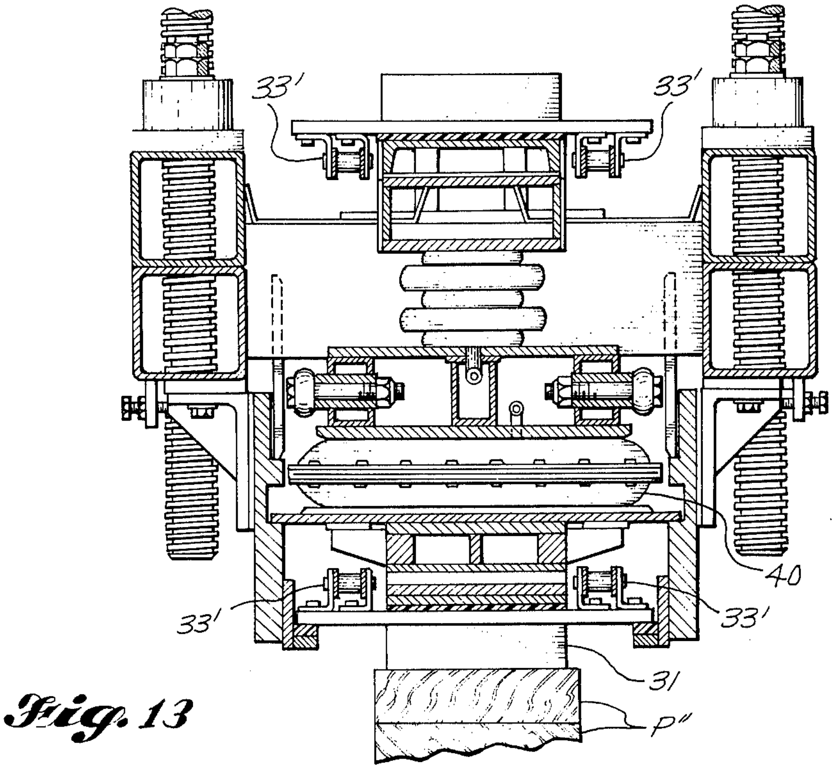
FIG. 13 is another transverse section taken on line 13—13 of FIG. 10.
Figure 14:
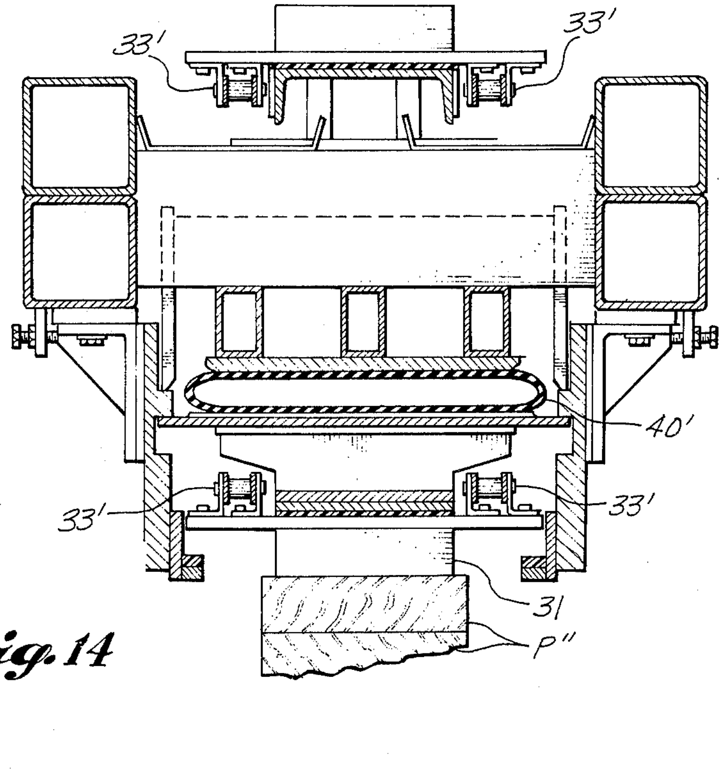
FIG. 14 is still another transverse section through such press taken on line 14—14 of FIG. 10.

The spacing between the upper and lower endless tread belts 12' and 11' can be altered to accommodate packs P'' of different thickness by raising or lowering the upper tread belt bodily. Such elevational adjustment of the upper tread belt can be effected by rotating simultaneously screws 58' carrying the frame which supports the upper endless tread belt 12'. Such screws are rotated simultaneously by a system of chains interconnecting sprockets mounted on the shafts of the various screws as shown in FIGS. 10, 11 and 12. This adjusting mechanism is similar to that shown in FIGS. 1, 2 and 3 and described above.

Central cross chains 59' are driven simultaneously by an adjusting chain turning a sprocket 59'' mounted on the shaft carrying sprockets with which the cross chains 59' are engaged. One of the chains 59' turns the shaft of a screw 58' which shaft also carries a sprocket for chain 60', extending lengthwise of the press. The adjusting screw shaft driven by this chain also drives a cross chain 63' for driving the corresponding screw at the opposite side of the press as indicated in FIG. 11.

The other cross chain 59' drives a shaft of screw 58' at the opposite side of the press, on which shaft is mounted a sprocket for driving another endless chain 65' extending longitudinally of the press. This chain drives another shaft of a screw 58', which shaft carries a sprocket for driving cross chain 63''. This cross chain drives synchronously the shaft of another adjusting screw 58' at the opposite side of the press. Consequently, by the sprocket-and-chain connections shown in FIGS. 10, 11 and 12, all six of the screws 58' can be driven simultaneously and synchronously by rotating sprocket 59'' so as to raise or lower the upper tread belt 12' bodily.

In every elevationally adjusted position of the upper tread belt 12', the pressure which the upper tread plates 31 exert on the stack of boards P'' can be varied and controlled by altering the fluid pressure in the bags 40' interposed between the lower stretch of the endless tread belt 12' and the elevationally adjustable frame carrying that belt. This arrangement is similar to that described in connection with the fluid pressure bag 40 shown in FIG. 4, but the location of the fluid pressure member is somewhat different and the structure of the framework supporting the upper endless tread belt is modified, as shown in FIG. 12. The tread-mounting plates 32' bear directly on backing strips 29' of hard polyethylene plastic or other low friction material mounted on the elevationally adjustable frame.

Figure 16:
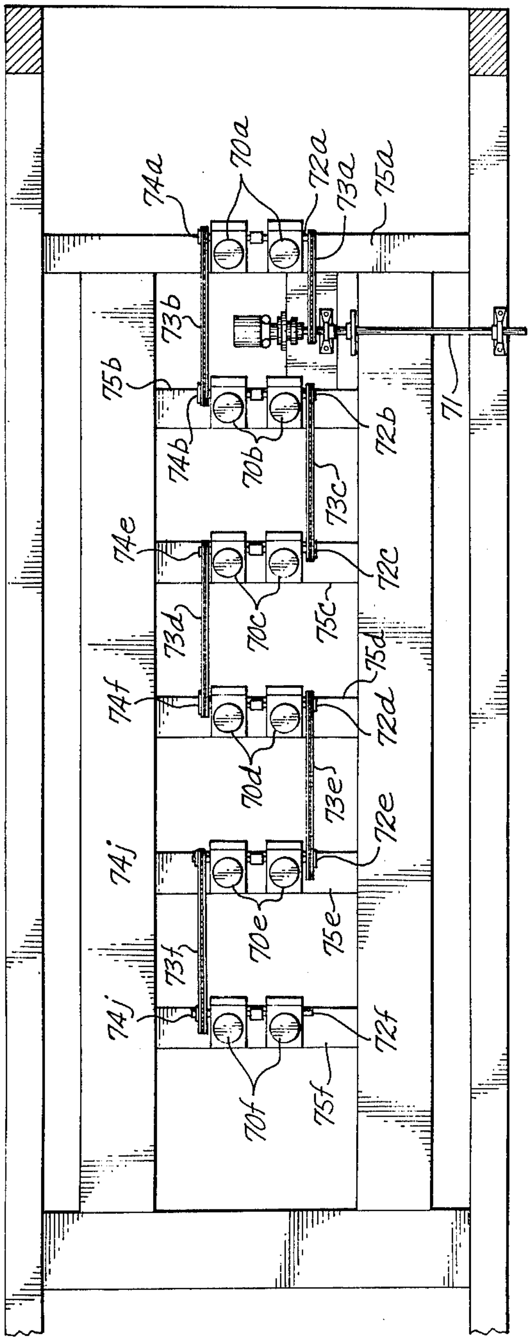
FIG. 16 is another longitudinal section taken through the press on line 16—16 of FIG. 10.
Figure 15:
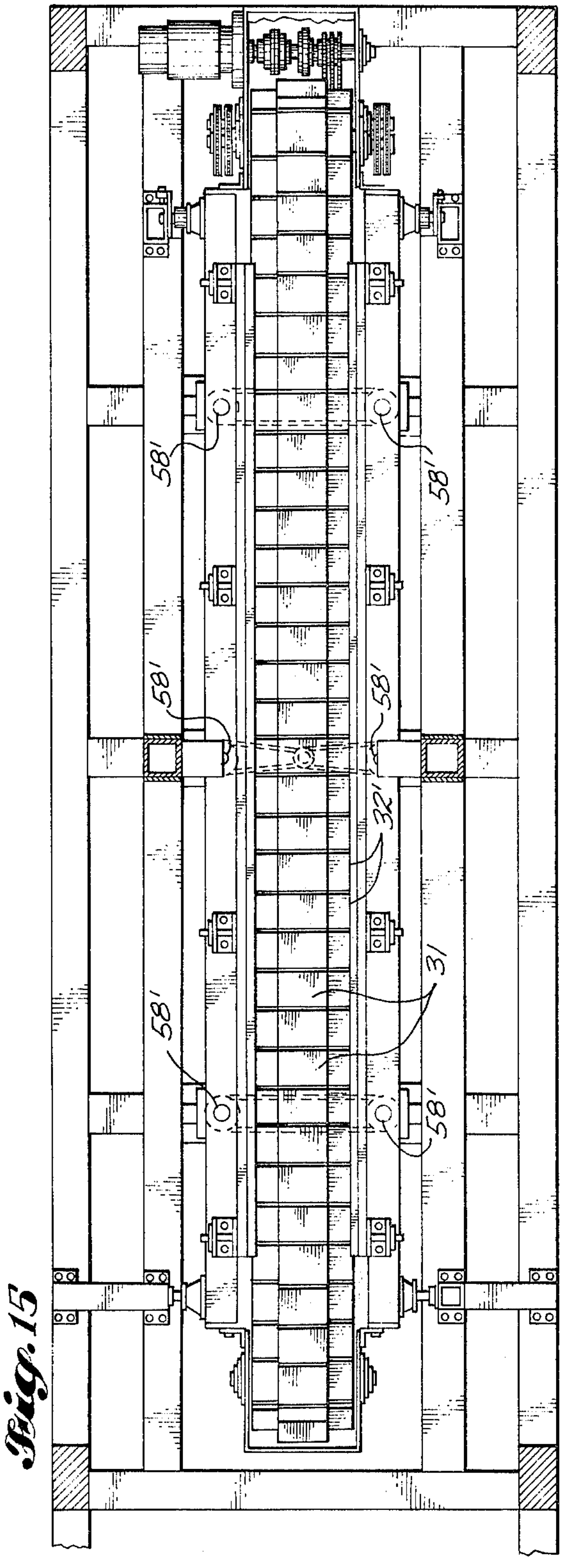
FIG. 15 is a longitudinal section through the press taken on line 15—15 of FIG. 10.

The curvature of the bed 30 supporting the lower endless tread belt 11' can be altered readily so that the press will form the pack of boards P'' into a beam having the desired degree of longitudinal curvature. The adjusting mechanism for varying the curvature of the press bed 30 is shown in FIGS. 10, 12 and 16. The press bed is supported by pairs of jacks spaced longitudinally of the press bed. Such jacks are of the screw type and may be antifriction screw jacks, if desired. All the jacks are interconnected so that, when one jack is adjusted, all of the other jacks will be adjusted simultaneously and to a related degree.

In FIG. 10 the pairs of jacks 70*a*, 70*b*, 70*c*, 70*d*, 70*e* and 70*f* are shown as being extended to progressively greater degrees from left to right. The jacks are all adjusted simultaneously and in proper ratio by turning shaft 71. Turning of such shaft rotates shaft 72*a*, to which it is connected by chain 73*a*. Rotation of shaft 72*a* will adjust the pair of jacks 70*a*, and such adjustment will be greater than the adjustment of any of the other pairs of jacks.

Shaft 72*b* of the jacks 70*b* will be rotated by chain 73*b*. This chain connects a sprocket 74*a* on shaft 72*a* and a sprocket 74*b* on shaft 72*b*. Sprocket 74*a* is smaller than sprocket 74*b* to the extent necessary for turning shaft 72*b* in the proper proportion to shaft 72*a*. In turn, shaft 72*c* of jacks 70*c* is turned by chain 73*c* connecting sprocket 74*c* on shaft 72*b* and sprocket 74*d* on shaft 72*c*. Shaft 72*d* of jacks 70*d* is turned by chain 73*d* connecting sprocket 74*e* on shaft 72*c* and sprocket 74*f* on shaft 72*d*. Shaft 72*e* of jacks 70*e* is turned by chain 73*e* connecting sprocket 74*g* on shaft 72*d* and sprocket 74*h* on shaft 72*e*. Finally, shaft 72*f* of jacks 70*f* is turned by chain 73*f* connecting sprocket 74*i* on shaft 72*e* and sprocket 74*j* on shaft 72*f*.

Sprocket 74*c* is smaller than sprocket 74*d*, sprocket 74*e* is smaller than sprocket 74*f*, sprocket 74*g* is smaller than sprocket 74*h*, and sprocket 74*i* is smaller than sprocket 74*j*. Consequently, not only will shaft 72*b* be turned to a lesser degree than shaft 72*a*, but shaft 72*c* will be turned less than shaft 72*b*, shaft 72*d* will be turned less than shaft 72*c*, shaft 72*e* will turned less than shaft 72*d*, and shaft 72*f* will be turned less than shaft 72*e*. The effective length of jacks 70*b* will be altered less than the effective lengths of jacks 70*a*, the lengths of jacks 70*c* will be altered less than the lengths of jacks 70*b*, the lengths of jacks 70*d* will be altered less than the lengths of jacks 70*c*, the lengths of jacks 70*e* will be altered less than the lengths of jacks 70*d*, and the lengths of jacks 70*f* will be altered less than the lengths of jacks 70*e*.

Since all of the jack pairs are positively interconnected by the chain-and-sprocket reducer mechanis described, the ratio of movement of each jack will be related to the degree of movement of all other jacks in accordance with the speed reduction ratio between such jacks. The change in curvature of the press bed 30 will correspond to the varying degrees of change in the effective length in the jack pairs. All of the jacks can therefore be adjusted simultaneously and in proper proportion simply by turning the shaft 71.

The alteration in curvature of the press bed 30 will be small enough so that the endless tread belt 11' will not be altered appreciably, but suitable tightening mechanism for such endless tread belt may be provided as required. The pairs of jacks are mounted respectively on cross members 75*a*, 75*b*, 75*c*, 75*d*, 75*e* and 75*f*, as shown in FIGS. 10, 12 and 16, which are spaced above the floor F sufficiently to accommodate the return stretch of the endless tread belt 11' between such jack-supporting members and the floor, as shown in FIG. 10.

I claim:

1. A laminating traveling press for laminating a pack of boards comprising upper and lower endless tread belts having an entering end and a discharge end and engageable with the upper and lower sides, respectively, of a pack of substantially horizontal boards for moving such pack of boards generally horizontally lengthwise from the entering end to the discharge end; lower belt supporting means for supporting said lower endless tread belt with its entering end lower than its discharge end and shaping it curved lengthwise concavely upward with all portions thereof at least substantially as high as its entering end for holding the pack of boards correspondingly curved lengthwise while said belts effect movement thereof through the press to produce a cambered laminated structure formed in an arc of predetermined radius; adjusting means for adjusting said lower belt supporting means to alter the degree of curvature of said lower endless tread belt effected by said lower belt supporting means; and upper belt backing means pressing said upper endless tread belt resiliently downward against the upper surface of the pack of boards into longitudinally downwardly convex shape curved complementally to the upwardly concave curvature of said lower endless tread belt, said upper belt backing means being deformable to enable said upper endless tread belt to automatically and dependently conform to the curvature of said lower endless tread belt.

2. The press defined in claim 1, in which the lower belt adjusting means includes a plurality of shim means spaced lengthwise of the lower tread belt and of increasing height from the entering end to the discharge end to increase the elevation of the lower belt supporting means progressively from the entering end to the discharge end, the difference in thickness of adjacent shims determining the curvature contour of the lower endless tread belt.

3. The press defined in claim 1, in which the upper belt backing means includes an expandible elongated fluid pressure chamber extending longitudinally substantially the entire length of the upper endless tread belt and variable in effective thickness to accommodate the curvature of the upper endless tread belt, and retracting means for raising or lowering simultaneously said pressure chamber and the entire upper endless tread belt and its backing means relative to the lower endless tread belt to accommodate varying thickness of packs of boards being laminated.

4. A laminating traveling press for laminating a pack of boards comprising presser means including upper and lower endless tread belts engageable with the upper and lower sides, respectively, of a pack of substantially horizontal boards for moving such pack of boards generally horizontally lengthwise, supporting means for supporting said lower endless tread belt and maintaining it curved lengthwise concavely upward for holding the pack of boards correspondingly curved lengthwise while said belts effect movement thereof through the press to produce a cambered laminated structure formed in an arc of predetermined radius and including at least three jack means spaced apart lengthwise of said endless tread belts, and adjusting means including means interconnecting said jack means and operable automatically in response to adjustment of the effective length of one of said jack means to effect different predetermined proportionate adjustment of the effective length of the other jack means and to correlate the different degrees of effective length adjustment of said different jack means to effect concave upward curvature of said lower endless tread belt.

5. The press defined in claim 4, in which the adjusting means includes chain-and-sprocket speed reducer means interconnecting the three jack means.

* * * * *

UNITED STATES PATENT OFFICE
CERTIFICATE OF CORRECTION

Patent No. 4,035,223 Dated July 12, 1977

Inventor(s) George F. Russell

It is certified that error appears in the above-identified patent and that said Letters Patent are hereby corrected as shown below:

Title page, [57] Abstract, second column, tenth line, cancel "electrically grounded" and insert ..electrically-grounded..;
Column 9, line 7, cancel "thickness" and insert ..thicknesses..

Signed and Sealed this

*Fourteenth* Day of *February 1978*

[SEAL]

*Attest:*

RUTH C. MASON
*Attesting Officer*

LUTRELLE F. PARKER
*Acting Commissioner of Patents and Trademarks*